US006421348B1

United States Patent
Gaudet et al.

(12)
(10) Patent No.: US 6,421,348 B1
(45) Date of Patent: Jul. 16, 2002

(54) HIGH-SPEED NETWORK SWITCH BUS

(75) Inventors: Brian Gaudet, Bethlehem, PA (US); Vickie Pagnon, Sunnyvale; Naveen Gopalakrishna, Santa Clara, both of CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/108,846

(22) Filed: Jul. 1, 1998

(51) Int. Cl.[7] .......................... H04L 12/28; H04L 12/56
(52) U.S. Cl. .................... 370/401; 370/395.1; 370/235
(58) Field of Search ................................ 370/401, 402, 370/389, 395.1, 409, 412, 413, 419, 428, 229, 230, 395.42, 304, 360, 455

(56) References Cited

U.S. PATENT DOCUMENTS

| 5,303,302 | A | * | 4/1994 | Borrows | 713/161 |
| 5,867,677 | A | * | 2/1999 | Tsukamoto | 710/131 |
| 5,905,725 | A | * | 5/1999 | Sindhu et al. | 370/389 |
| 5,974,466 | A | * | 10/1999 | Mizutani et al. | 709/236 |
| 6,104,698 | A | * | 8/2000 | Fan et al. | 370/232 |
| 6,122,252 | A | * | 9/2000 | Aimoto et al. | 370/235 |
| 6,151,321 | A | * | 11/2000 | Benson et al. | 370/395 |
| 6,198,724 | B1 | * | 3/2001 | Lam et al. | 370/233 |
| 6,205,145 | B1 | * | 3/2001 | Yamazaki | 370/395 |

OTHER PUBLICATIONS

"High–Performance Bus Interface Designer's Guide (Futurebus+, PI–Bus, BTL)"; National Semiconductor Corporation, Santa Clara, California; pp. 1–80—1–93; 1992 Edition.

* cited by examiner

*Primary Examiner*—Dang Ton
*Assistant Examiner*—Brian Nguyen
(74) *Attorney, Agent, or Firm*—Stallman & Pollock LLP (57) ABSTRACT

A network switch divides incoming frame data into cells. Each of the cells include a source identification field. Depending upon bandwidth availability and upon cell priority, the cells are transmitted over a switch bus. The cells are then routed based upon the source identification field. The network switch determines bandwidth usage by monitoring the switch bus. Upon detection of a start-of-frame cell, the network switch increments a bandwidth counter. Upon detection of an end-of-frame cell, the network switch adds an entry to a decrement FIFO. After a switch bus latency period, the network switch removes the entry from the decrement FIFO and decrements the bandwidth counter.

17 Claims, 7 Drawing Sheets

HIGH-SPEED NETWORK SWITCH BUS

FIELD OF THE INVENTION

The invention relates generally to exchanging data over a network and more specifically to allocating bandwidth on a high-speed network switch bus.

BACKGROUND OF THE INVENTION

Networks are commonly used to interconnect computers or other devices. As the number of network computers increases so does the demand for network bandwidth. Network switches act to divide networks into sub-networks. As fewer computers are connected to one sub-network, the bandwidth of the sub-network is shared among fewer computers. Nonetheless, a computer on one sub-network may need to communicate with a computer on another sub-network. A network switch is responsible for providing the communication link between the two sub-networks. A network switch may also act to provide a communication link between two individual computers, or between an individual computer and a sub-network.

As with the sub-networks, the network switch has only limited bandwidth capacity. Where a large number of computers are connected using a network switch, the sum of the computer bandwidths may exceed greatly the bandwidth capacity of the network switch.

During normal operation, conversations between computers may occur within a sub-network. These conversations do not require bandwidth from the network switch. However, during peak operation, bandwidth demand on the switch bus may exceed capacity. During such periods, the network switch must determine how to allocate the available bandwidth. As the conversation data may include a priority field, higher priority data should be transmitted before lower priority data.

To effectively perform this allocation, a network switch must monitor the number of active conversations. Otherwise, the network switch may oversubscribe the available bandwidth and lose data. To avoid such data loss, a network switch must determine whether the available bandwidth is fully subscribed. If so, the network switch must delay additional conversations until some of the current conversations terminate.

The effective monitoring of bandwidth usage presents a complex problem, especially where a network switch interconnects sub-networks operating under different protocols. The beginning portion of a conversation packet will include a length field. Using the length field and the transmission speed, a network switch can determine the conversation's transmission requirements both in terms of time and bandwidth. If the conversation is begun, the network switch can use this information to monitor the loading of its bandwidth resources.

For example, a network switch may time each conversation to determine when it will terminate. When the conversation terminates, the network switch may reallocate bandwidth resources to other conversations. Individual timers, however, require expensive firmware.

The maximum amount of time a conversation must wait before the allocation of bandwidth is termed bus latency. To minimize bus latency, a network switch may divide a conversation into sub-packets or cells. The network switch will transmit only one of the sub-packets at a time instead of the longer conversation. This reduces bus latency because other conversations are given bus access after the completion of a sub-packet instead of after completion of the entire conversation. While this acts to reduce bus latency, the division into smaller packets requires additional overhead. For example, the network switch may need to attach a destination address to each of the sub-packets to ensure that they are properly routed. The network switch may also require handshaking to ensure that the sub-packets are properly received. These operations consume switch bandwidth that might otherwise be allocated to additional conversations.

Accordingly, a method of transmitting data over a network switch is desired which acts to minimize bus latency and to maximize bandwidth allocation to conversation data. At the same time, the network switch must act to ensure that conversations are started only if bandwidth is currently available. To this end, the method should accurately monitor current bandwidth usage. The method should allocate any available bandwidth based upon priority. This monitoring and allocation should be implemented using minimal firmware.

SUMMARY OF THE INVENTION

According to one aspect of the invention, a network switch suitable for interconnecting networks includes a plurality of ports, a receive FIFO and a switch bus. The plurality of ports are configured to receive frames from a network and divide the frames into cells, wherein each of the cells include a source port field. The receive FIFO is operationally coupled with the plurality of ports and is configured to receive the cells from the plurality of ports. The switch bus interface is operationally coupled with the receive FIFO and is configured to receive the cells from the receive FIFO and transmit the cells over a switch bus.

According to another aspect of the invention, a network switch suitable for interconnecting network devices includes a plurality of ports, a receive FIFO and a transmit FIFO. The plurality of ports is configured to send data to and receive data from a plurality of network devices. The receive FIFO is configured to receive data from the plurality of ports. The transmit FIFO is configured to transmit data to the plurality of ports. The bus interface is operationally coupled with the receive FIFO and the transmit FIFO and is configured to monitor a switch bus and to transmit and receive data over the switch bus. The bus interface includes a bandwidth counter and a decrement FIFO. The bandwidth counter is configured to increment after detection of a start-of-frame field and to decrement after detection of an end-of-frame field. The decrement FIFO is operationally coupled with the bandwidth counter. The bus interface is configured to store end-of-frame data on the decrement FIFO and to decrement the bandwidth counter after the end-of-frame data has been stored on the decrement FIFO for a latency period.

According to another aspect of the invention, frame data is received from a first port. The frame data is divided into cells, wherein each of the cells include a source port field. The cells are transmitted over a switch bus. The cells are received from the switch bus. The data cells are routed to a second port based upon the source port field.

DETAILED DESCRIPTION

Figure 1:
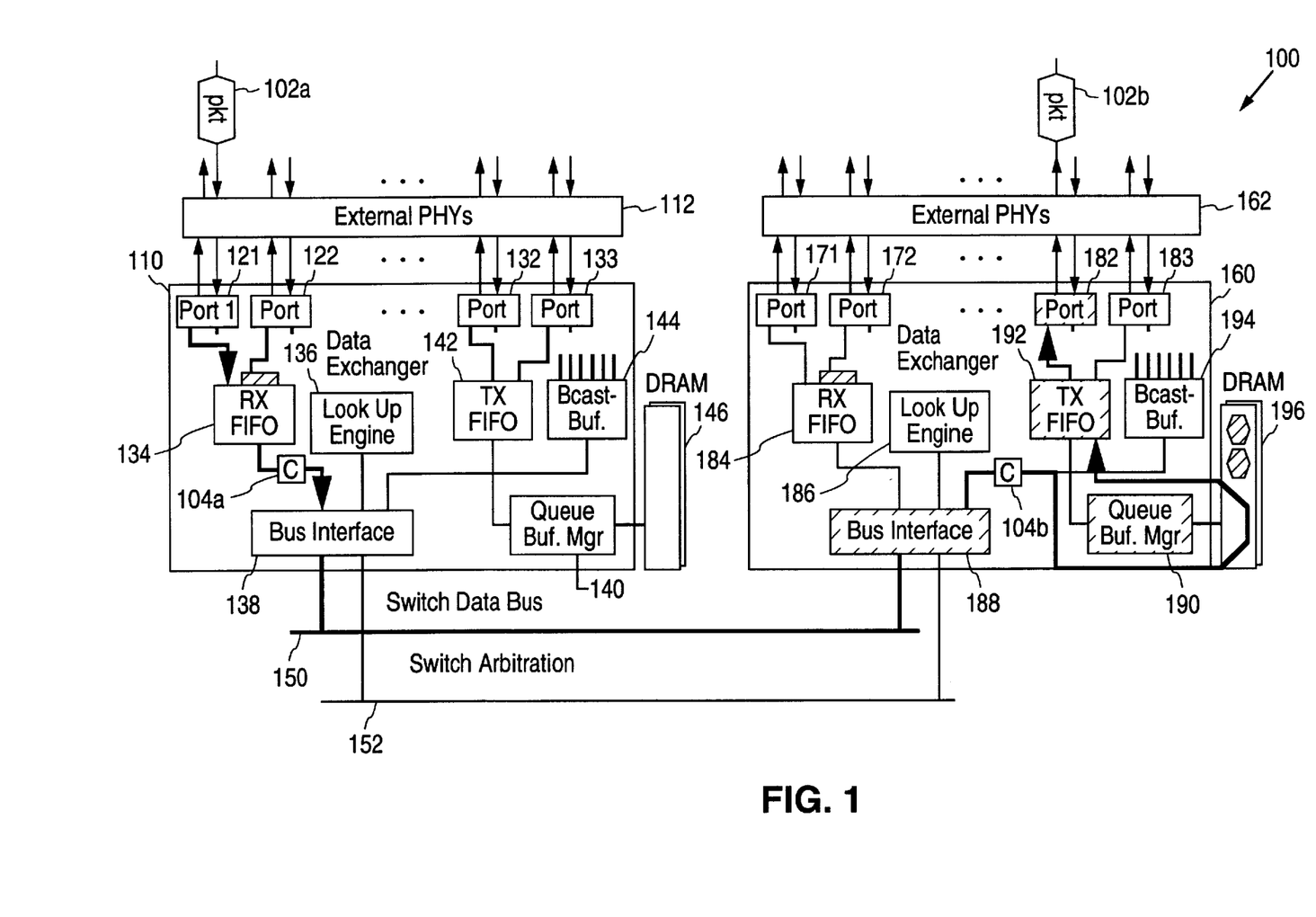
FIG. 1 is a block diagram of one preferred embodiment of a switched network including two data exchangers connected by a switch bus.

FIG. 1 shows one preferred embodiment of a switched network 100 including a first data exchanger 110 and a second data exchanger 160. As shown, the data exchangers 110 and 160 each include several functional blocks that enable high speed routing of packet data. These functional blocks may be implemented using commercially available components such as controllers or processors, or may be specially designed to perform the functionality herein described.

Data exchanger 110 and data exchanger 160 each provide a number of ports for connecting to external network devices. More specifically, data exchanger 110 provides ports 121–133 (ports 123–131 not shown), and data exchanger 160 provides ports 171–183 (ports 173–181 not shown). Ports 121–133 each connect to an external physical layer 112. As shown, the external physical layer 112 may consist of a single device operative to connect each port to a physical network. The physical layer 112 may also consist of a number of separate devices each operative to connect a single port to a network. The physical layer 112 provides the physical connection to a network, and provides a media independent interface to the ports 121–133. Each of ports 171–183 connect to an external physical layer 162. External physical layer 162 provides the same functionality as physical layer 112. Each of ports 121–133 and 171–183 provide media access control functionality for transmitting and receiving data over a network.

Data exchanger 110 connects to data exchanger 160 over a switch bus 150 and a switch arbitration link 152. As will be explained further below, packet data received through a port by data exchanger 110 may be transmitted to data exchanger 160 over switch bus 150. Data exchanger 160 may in turn transmit the packet data through one of its ports. In this way, a network device connected to one of ports 121–133 may transmit data to a device connected to one of ports 171–183. Likewise, a network device connected to one of ports 171–183 may transmit data to a device connected to one of ports 121–133. Although only two data exchangers are shown, additional data exchangers may be connected over switch bus 150 and switch arbitration link 152.

Data exchanger 110 includes a receive FIFO 134, a transmit FIFO 142, and a broadcast buffer 144. Receive FIFO 134 connects to each of the ports 121–133 to receive packet data. Receive FIFO 134 provides temporary storage of frame data prior to sending the data over switch bus 150.

Transmit FIFO 142 connects to each of ports 121–133 to transmit unicast frame data. Transmit FIFO 142 includes a separate FIFO for each port. Transmit FIFO 142 moves data from an external memory 146, through the appropriate FIFO, and to the appropriate port by using the destination address of the unicast frame data.

Broadcast buffer 144 connects to each of ports 121–133 to transmit broadcast and multicast frame data. Broadcast buffer 144 includes a 10 Mb/s and a 100 Mb/s FIFO. These FIFOs also move data from external memory 146 to the appropriate ports.

Bus interface 138 transfers data from receive FIFO 134 to switch bus 150. Bus interface 138 provides low voltage high bandwidth drivers for sending data over switch bus 150. Bus interface 138 also reads data from switch bus 150. Bus interface 138 provides header data to the look up engine 136, and provides frame data to transmit buffer 142 and broadcast buffer 144.

As will be explained further below, bus interface 138 accesses the look up engine 136 to determine whether to accept data from the switch bus and to maintain a routing table. If the data is accepted, the bus interface 138 uses the header data to give buffer manager 140 routing instructions.

Based on the routing instructions, buffer manager 140 stores the data in external memory 146. Buffer manager 140 also tracks memory usage and controls queues in the external memory 146. The queues are used to store data for congested ports.

Data exchanger 160 includes functional blocks that act in the same manner as those of data exchanger 110. Specifically, data exchanger 160 includes a receive FIFO 184, a look up engine 186, a bus interface 188, a buffer manager 190, a transmit FIFO 192, a broadcast buffer 194, and an external memory 196. These blocks function in the same manner as receive FIFO 134, look up engine 136, bus interface 138, buffer manager 140, transmit FIFO 142, broadcast buffer 144, and external memory 146, respectively.

The path of a single unicast packet will now be described as it moves from data exchanger 110 to data exchanger 160. To start, a packet 102a is received by the external physical layer 112. When operating properly, a first packet will be received completely before another packet is received by the same port. The external physical layer 112 translates the packet 102a into frame data, which is provided over a media independent interface to port 121. The translation converts the media dependent packet data into nibble wide NRZ format.

Port 121 monitors the incoming data for a start of frame delimiter (SOF). Upon receipt of the SOF, port 121 divides the frame data into 48-bit cells. The cells are then passed to receive FIFO 134. When the number of cells in receive FIFO 134 exceeds a drain threshold, the cells are loaded into a bus FIFO. When the bus FIFO exceeds a drain threshold, data exchanger 110 asserts a switch bus request over switch arbitration link 152. If it wins an arbitration, it will then transmit the first cell 104a stored in the bus FIFO over switch bus 150. The bus FIFO will continue transmitting cells until all cells have been transmitted.

Data exchanger 160 monitors switch bus 150. Look up engine 186 parses the first cell 104b to determine whether the destination address field matches that of any devices connected to ports 171–183. In this example, look up engine 186 determines that the destination address field matches that of a device connected to port 182. In response, look up engine 186 provides a match signal back to data exchanger 110, and directs buffer manger 190 to reserve a buffer in memory 196. The buffer in memory 196 is large enough to store the entire frame in contiguous memory locations. As subsequent cells from the same frame are received, the buffer manager 190 sequentially stores the cells in the contiguous memory locations.

When the number of cells stored in the buffer exceed a drain threshold, the data is passed to transmit FIFO 192. Again, the transmit FIFO 192 includes a separate FIFO for each of ports 171–183. The data is provided to the transmit FIFO associated with port 182. The transmit FIFO associated with port 182 converts the 48-bit wide data to nibble wide data. This data is provided over a media independent interface to the physical layer 162. The physical layer 162 translates the data into a packet 102b, which is transmitted over a network connection.

Broadcast or multicast packets have a similar data flow. The buffer manager 190 stores the cell data into contiguous memory locations within memory 196. When the number of cells stored in the memory 196 exceed a drain threshold, the data is passed to broadcast buffer 194 instead of transmit FIFO 192. Again, broadcast buffer 194 includes a 10 Mb/s buffer and a 100 Mb/s buffer. Both of these buffers provide the data to ports 171–183. Depending upon the external physical layer 162, the respective port provides either the 10 Mb/s or the 100 Mb/s data over a media independent interface to the physical layer 162. The physical layer 162 translates the data into packets, which are transmitted over the respective network connection.

In another preferred embodiment, a data exchanger is configured so that all packet data received over a switch bus is passed through the look-up engine. The look-up engine then provides the packet data and control signals to other modules.

Figure 2:
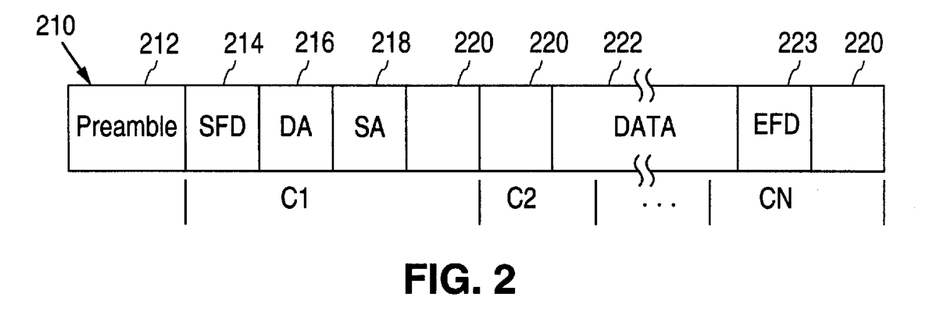
FIG. 2 is block diagram of one preferred embodiment of the division of a frame into cells.

Turning to FIG. 2, a preferred process by which ports 121–133 divide frame data into cells is described. A data frame 210 begins with a preamble field 212, an SOF field 214, a destination address field 216 and a source address field 218. The data frame 210 also includes fields 220, which may contain priority, type, length or other data. The data frame 210 further includes a variable length data field 222, and an end of frame delimiter (EOF) field 223.

As a frame is received over a port, the frame is divided into 48-bit wide cells. For example, data frame 210 is divided into cells C1, C2, . . . CN. The first cell C1 will include the destination address field 216, however, subsequent cells (i.e. C2, . . . CN) will not. Ordinarily, the destination address field allows a network to route data to the proper destination. However, as the subsequent cells do not include the destination address field they cannot be routed based on the destination address field. As will be explained further below, a source port identifier is attached to the cells. The cells are then routed based on the source port identifier.

Figure 3:
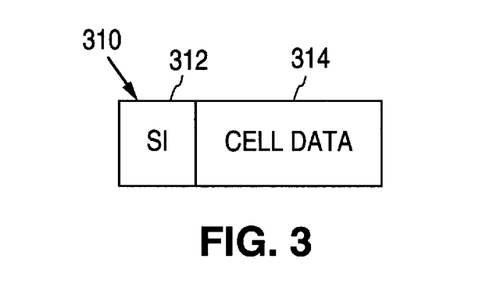
FIG. 3 is a block diagram of one preferred embodiment of a data cell.

Turning to FIG. 3, a cell 310 is shown. The cell 310 includes a source information field 312 and a data field 314. In a preferred embodiment, each data exchanger has a maximum of 13 ports and a maximum of 13 data exchangers may be cascaded together over a switch bus. Accordingly, the maximum number of ports is 156, and 8bits of source information field 312 are sufficient to identify uniquely each source port. Source information field 312 also includes speed and type information relating to the source port. The speed information identifies whether the source port operates at 10 Mb/s, 100 Mb/s or another speed. The type information indicates whether the cell data is part of an ATM OC3 frame, an ATM OC12 frame, a reserve frame, or another type frame. The data field 314 contains 48-bit portions of a frame such as one of cells C1 . . . CN from FIG. 1.

As discussed above, the incoming frame data is divided into cells and placed on a receive FIFO. The cells are then transmitted over a switch bus, and received by another data exchanger. While receiving cells, a data exchanger maintains a routing table, which associates the source identification field with the frame destination. As only the first cell contains the destination address field, the routing table enables the data exchanger to properly route the subsequent cells, which do not have a destination address field.

Figure 4:
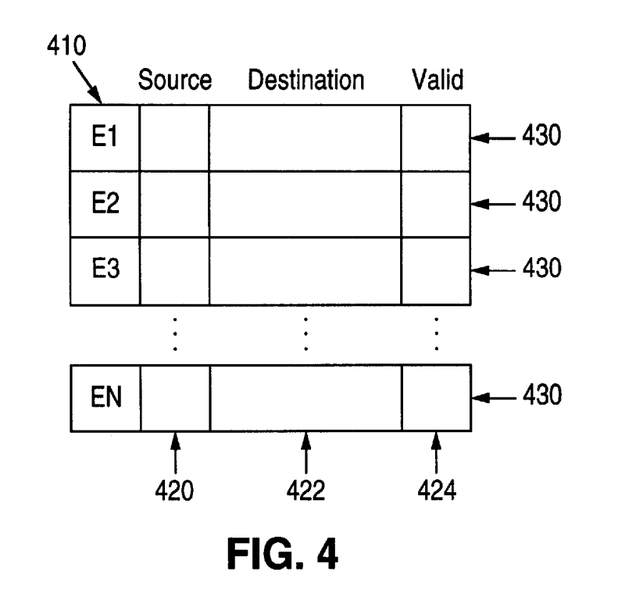
FIG. 4 is a block diagram showing a preferred embodiment of a routing table.

Turning to FIG. 4, one preferred embodiment of a routing table 410 is shown. The table includes a plurality of entries shown as rows 430 (E1–EN). Each of the rows 430 are divided into a source field 420, a destination field 422, and a valid field 424. At initialization the valid field 424 of all rows 430 is set to zero indicating that the entry is invalid. While monitoring the switch bus, the data exchanger may detect a first cell having a destination address field that matches the address of a device connected to one of its ports. When this occurs, the data exchanger receives the cell and updates its table 410. Specifically, the data exchanger selects an invalid row. The data exchanger then loads the source port ID and destination port ID of the cell into the source field 420 and destination field 422, respectively. Alternatively, the data exchanger may load the cell's destination address field into the destination field 422, however this requires more memory than the destination port ID. The data exchanger then sets the valid field 430.

Although subsequent cells will not contain a destination address field, the data exchanger is able to properly route the cells by monitoring the source information field 312. When the data exchanger detects a cell having a source ID that matches the source field 420 of a valid table entry, the cell is accepted and routed according to the destination field 422. When the data exchanger detects that the cell includes an EOF, the data exchanger invalidates the table entry.

Figure 5:
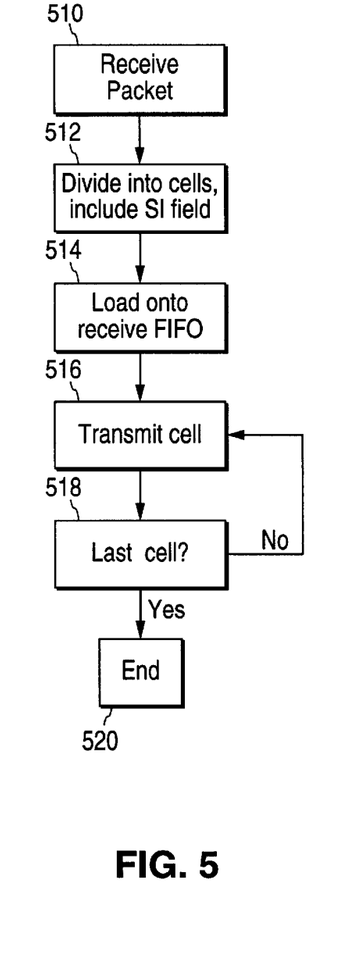
FIG. 5 is flow chart showing one preferred operation of one of the data exchangers of FIG. 1 as it receives a packet from a network.

The operation of a data exchanger transmitting cells over a switch bus and receiving cells over a switch bus will now be explained further with reference to FIGS. 5 and 6, respectively. Turning to FIG. 5, the preferred operation of a data exchanger receiving a frame from a port and transmitting cells over a switch bus will be described. The data exchanger begins at block 510 where one of its ports receives a frame. At block 512, the data exchanger divides the frame into cells and attaches the source information field. At block 514, the data exchanger loads the cells onto a receive FIFO. At block 516, the data exchanger transmits the first cell over a switch bus. At block 518, the data exchanger tests whether there are any additional cells on the receive FIFO. If there are additional cells on the receive FIFO, the data exchanger returns to block 516 to transmit the next cell. Otherwise, if there are no additional cells, the process terminates at block 520. If another packet is received, the process begins again at block 510.

Although the process of receiving frame data has been described with reference to a single port, the data exchanger may simultaneously load cells from different ports onto the receive FIFO. This process will be further described below with reference to FIG. 7, however during normal operation one port will receive only one frame at a time. In other words, one port will not receive a second frame until after a first frame is fully received.

Figure 6:
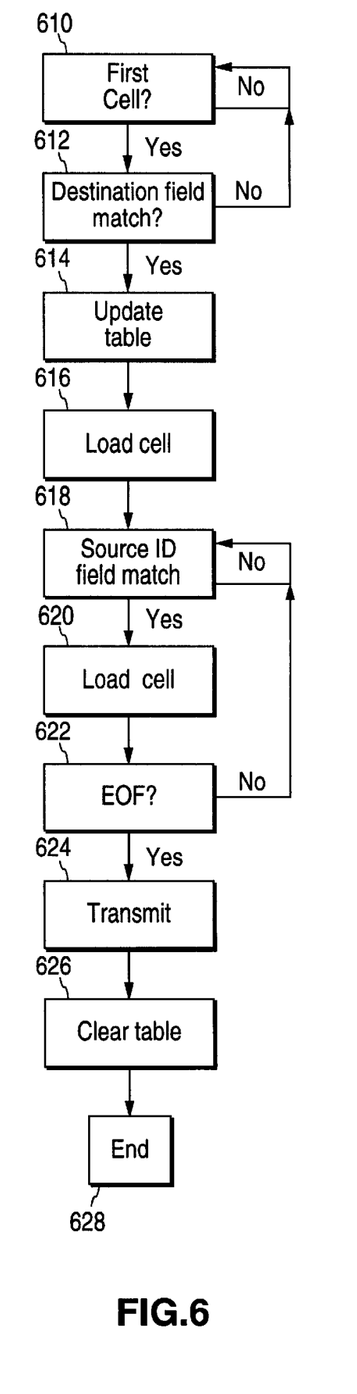
FIG. 6 is a flow chart showing one preferred operation of one of the data exchangers of FIG. 1 as it receives/cells from over a switch bus.

Turning to FIG. 6, the preferred operation of a data exchanger receiving cells over a switch bus and transmitting a frame over a port will be described. The data exchanger begins at block 610 where the data exchanger monitors the switch bus for a first cell. A first cell will contain both a destination address field and a source port ID. If the data exchanger does not detect a first cell, the data exchanger continues to monitor the switch bus.

Otherwise, at block 612, the data exchanger determines whether the destination address field matches the address of any devices connected to one of its ports. If not, data exchanger returns to block 610 to monitor for subsequent first cells. If so, at block 614, the data exchanger updates its routing table. Specifically, the data exchanger loads the source ID into an invalid source field, loads the destination ID into the associated destination field, and sets the associated valid field to one.

At block 616, the data exchanger allocates a buffer sufficient to hold all of the cells associated with incoming frame and loads the first cell into the first memory location of the buffer. At block 618, the data exchanger continues to monitor the switch bus for cells containing a source ID that matches the source field of a valid routing table entry. If the data exchanger detects such a cell then at block 620 the data exchanger loads the cell into the next memory location of the associated buffer. In this way, sequential cells associated with a single frame will be stored in contiguous memory locations of the associated buffer.

At block 622, the data exchanger tests whether the cell, which was just loaded into the buffer, contains an EOF. The EOF indicates that the last cell of the frame has been received. If the cell does not contain an EOF, the data exchanger returns to block 618 to continue monitoring for source port ID matches. If the cell does contain an EOF, the data exchanger proceeds to block 624. Here, the data exchanger moves the cells from the buffer into the appropriated transmit FIFO. The frame data is then transmitted out of the port connected to the device having a matching destination address.

Since this frame has been fully received, subsequent cells from the same source port may be directed to a different destination address. Accordingly, the routing table needs to be updated so that such subsequent cells are not routed to the same port. Therefore, at block 624, the data exchanger indexes the source ID in the packet table and sets the associated valid bit equal to zero.

The above described process of receiving frame data from a port and transmitting cell data over a switch bus limits latency to the amount of time required to transmit cells instead of the amount of time required to transmit frames. Moreover, use of the source port ID to route cells produces only a modest increase in the use of switch bus bandwidth. The increase is significantly less than would be required by attaching the full 48-bit destination address to every cell.

As mentioned above, although one port may receive only one frame at a time, each data exchanger includes multiple ports. Accordingly, a data exchanger may receive simultaneously multiple frames. As the packets may be simultaneously received, they are simultaneously divided into cells and placed on the receive FIFO. Accordingly, cells from different packets may intermixed on the receive FIFO. The process by which these cells are arranged on the FIFO and subsequently transmitted over the switch bus will now be discussed in greater detail.

Figure 7:
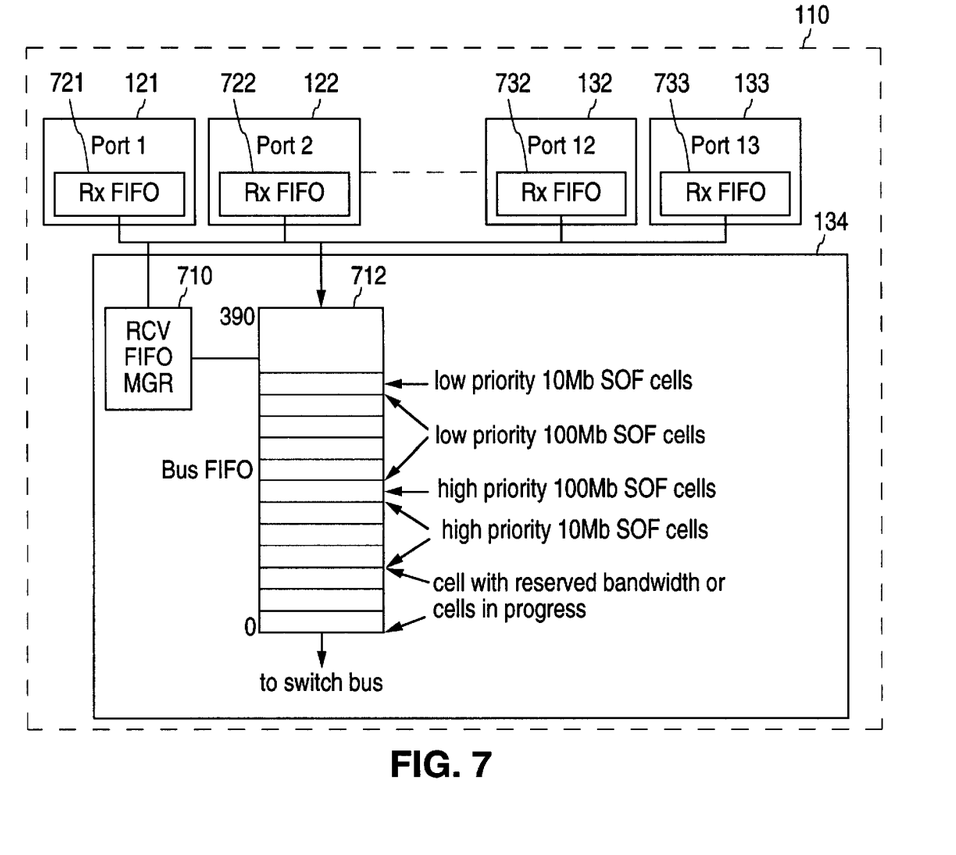
FIG. 7 is a block diagram of one preferred embodiment of one of the data exchangers of FIG. 1, a receive FIFO and a plurality of ports.

Turning to FIG. 7, a preferred embodiment of data exchanger 110, including receive FIFO 134, is described. As shown, the receive FIFO 134 includes a FIFO manager 710 connected to a bus FIFO 712. Each of ports 121–133 (ports 123–131 not shown) include a port FIFO 701–713 (port FIFOs 703–711 not shown), respectively. The FIFO manager 710 is also connected to port FIFOs 721–733. As a frame is received by a port, the port divides the frame into cells and stores the cells on its port FIFO. The FIFO manager 710 polls the ports 121–133 to determine which ports currently have cells ready to be placed on the bus FIFO 712. The FIFO manager 710 also determines the type of cells currently waiting for transmission. The receive FIFO 134 prioritizes the waiting cells according to the following list:

1. cells with reserved bandwidth or cells in progress (i.e. non-SOF cells)
2. high priority 10 Mb SOF cells
3. high priority 100 Mb SOF cells
4. low priority 10 Mb SOF cells
5. low priority 100 Mb SOF cells After polling the ports, the buffer manager loads the available cells onto the bus FIFO 712 based on their priority. Accordingly, cells with reserve bandwidth will be loaded first, and low-priority 100 Mb SOF cells will be loaded last.

As mentioned above, up to 156 ports may be connected over a switch bus and each port may be configured to communicate at 100 Mb/s. In a preferred embodiment, the switch bus has a maximum throughput of 2.4 Gb/s. Thus, the sum of the ports data throughput capacity may exceed greatly that of the switch bus. When operating in cut-through mode, a switch bus carrying more traffic than its bandwidth capacity will under run the transmit FIFOs. In other words, cells stored in a transmit FIFO may be overwritten before transmission over the appropriate port. Hence, the buffer manager must control the loading of the bus FIFO to ensure that conversations between ports are started only if the switch bus can accommodate the conversation.

Moreover, a network device may reserve network bandwidth. Reserve bandwidth must at all times remain available for the network device. Accordingly, the loading control must ensure that the reserve bandwidth is not consumed by other conversations.

Figure 8:
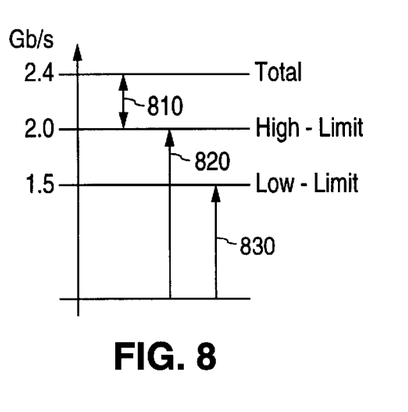
FIG. 8 is a graph showing one preferred allocation of switch bus bandwidth.

A preferred implementation of loading control will now be described. Turning to FIG. 8, a graph illustrating an example of bandwidth allocation is shown. The total available bandwidth of the switch bus is 2.4 Gb/s. Segment 810 shows the portion of the total that has been reserved for specific port traffic. As shown, 0.4 Gb/s has been reserved and 2.0 Gb/s remains for high and low-priority bus traffic. Segment 820 shows the portion of the bandwidth that may be used for high-priority bus traffic. This portion includes the full 2.0 Gb/s, which was not reserved. Accordingly, high-priority conversations may never exceed the 2.0 Gb/s high-limit. Likewise, the combination of high and low-priority conversations may never exceed the 2.0Gb/s high-limit. Segment 830 shows the portion of the bandwidth that may be used for low priority bus traffic. This portion includes 1.5 Gb/s. Accordingly, low-priority conversations may never exceed the 1.5 Gb/s low-limit.

Again, loading control must ensure that conversations are started only if the switch bus can accommodate the conversation. Loading control must also ensure that reserve bandwidth is reserved for the appropriate port, and that conversations do not exceed the appropriate limit. Accordingly, each data exchanger monitors switch bus loading. The data exchangers implement loading control so that conversations are started only if the conversation does not cause the switch bus to exceed a bandwidth limit.

Figure 9:
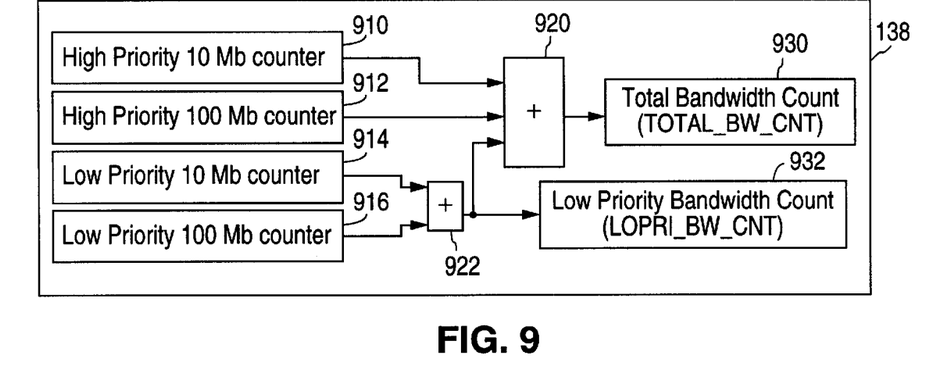
FIG. 9 is a block diagram of one preferred embodiment of a bus interface.

Turning to FIG. 9, a block diagram of a preferred embodiment of bus interface 138, including a bandwidth monitoring circuit, is described. Bus interface 138 includes four primary up-down counters 910, 912, 914 and 916. Upon detection of a high-priority 10 Mb/s cell containing an SOF field, bus interface 138 increments counter 910. After detection of a high-priority 10 Mb/s cell containing an EOF field, bus interface 138 decrements counter 910. Similarly, counter 912 is incremented upon detection of a high-priority 100 Mb/s cell containing an SOF field and decremented after detection of a high-priority 100 MB/s cell containing an EOF field. Counters 914 and 916 function in the same manner as counters 910 and 912, respectively, except that counters 914 and 916 are incremented and decremented based on a low-priority cell instead of the high priority cell.

A 100 MB/s conversation will consume more bandwidth than a 10 Mb/s conversation. Accordingly, the 100 MB/s counters 912 and 916 are incremented by a proportionally greater value upon the detection of an SOF field. Similarly, these counters are decremented by a proportionally greater value upon detection of an EOF field.

Block 922 adds the value of counter 914 to that of 916 to provide a low-priority bandwidth count (LOPRI-BW-CNT) 932. Block 920 adds the output of block 922 with the values of counters 910 and 912 to provide a total bandwidth count (TOTAL-BW-CNT) 930.

In addition to ordinary 10 Mb/s and 100 MB/s cells, a data exchanger may also transmit reserve cells. Bandwidth for the reserve cells is not allocated to any other type of conversation. The reserve bandwidth is therefore always available to the reserve cells. Accordingly, the reserve cells do not increment or decrement a counter.

The data exchanger may also transmit ATM cells, 1000 Mb/s cells, pay-as-you-go cells, and other types of cells. Data exchanger 138 will maintain a high priority and low priority counter for each of these other cell types. The low priority counts are added to LOPRI-BW-CNT 932, and the high priority counts are added to TOTAL-BW-CNT 930. By monitoring the bandwidth loading of the switch bus, data exchanger 138 is able to determine whether it may start additional conversations. If one of ports 121–133 has just received a frame, the interface determines whether the switch bus currently has enough bandwidth available to transmit that frame. If so, the frame is placed on the receive FIFO 134 for transmission over the switch bus 150. Otherwise, the frame is stored in a port FIFO until bandwidth becomes available.

Figure 10:
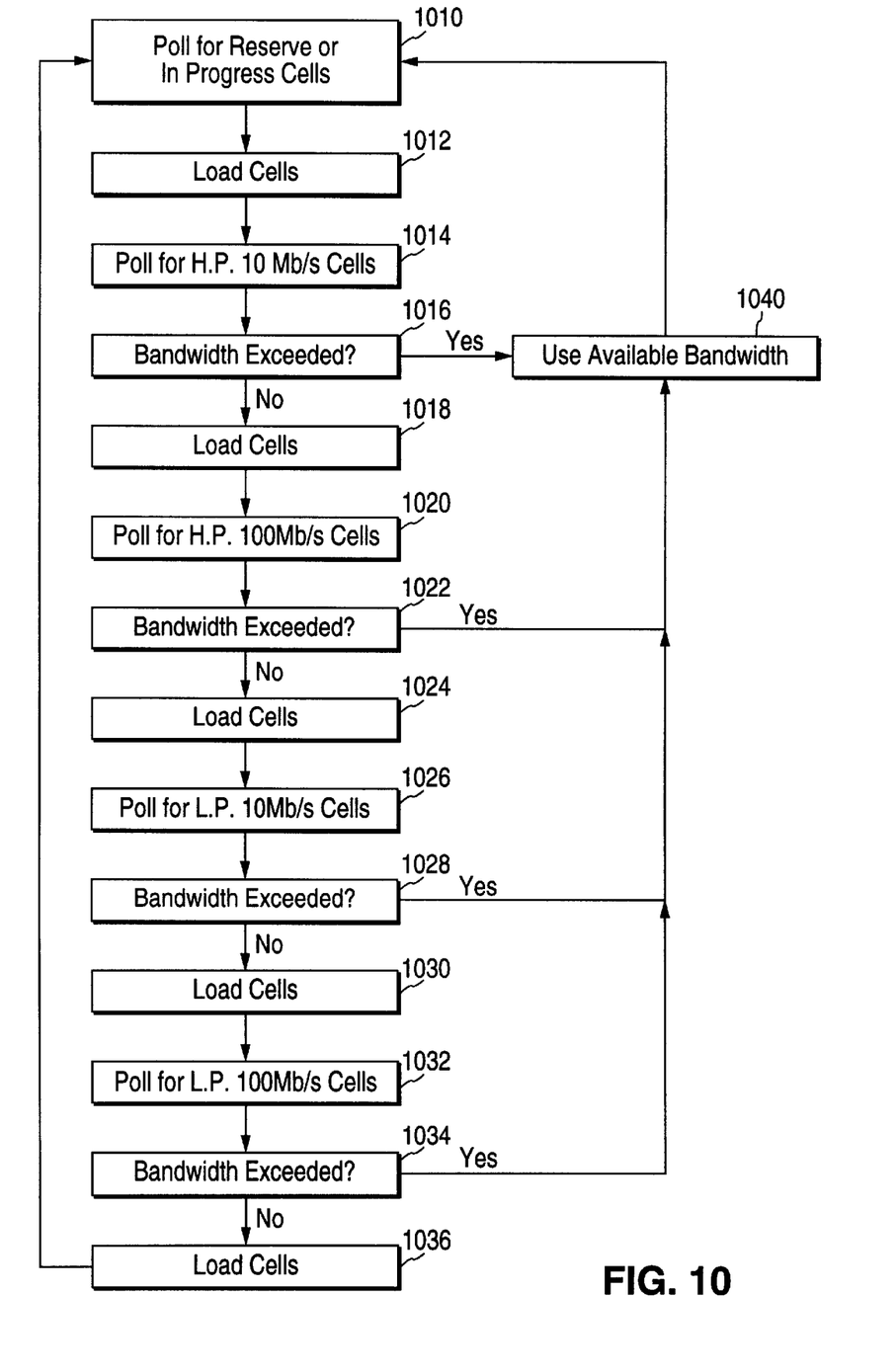
FIG. 10 is a flow chart showing one preferred operation of one of the data exchangers of FIG. 1 as it loads cells onto a bus FIFO.

Turning to FIG. 10, a preferred operation of a receive FIFO (such as receive FIFO 134 of FIG. 7) will be described. The receive FIFO uses the LOPRI-BW-CNT 932 and TOTAL-BW-CNT 930 (of FIG. 9) to make decisions as to the loading of incoming cells. The receive FIFO begins at block 1010 where it determines which ports have reserve cells or cells from in-progress frames ready to place onto a bus FIFO. At block 1012, the receive FIFO loads such reserve and in-progress cells onto the bus FIFO.

At block 1014, the receive FIFO determines which ports have high-priority 10 Mb/s SOF cells ready to place onto the bus FIFO. At block 1016 the receive FIFO calculates a count representing the bandwidth of the available high-priority 10 Mb/s SOF cells (hereinafter HP-10-CNT). The receive FIFO adds this count to the current value of TOTAL-BW-CNT. If this sum is less than or equal to the high-limit, then the receive FIFO proceeds to block 1018. Here, the receive FIFO loads the available high-priority 10 Mb/s SOF cells onto the bus FIFO.

At block 1020, the receive FIFO determines which ports have high-priority 100 MB/s SOF cells ready to place onto the bus FIFO. At block 1022, the receive FIFO calculates a count representing the bandwidth of the available high-priority 100 MB/s SOF cells (hereinafter HP-100-CNT). The receive FIFO adds this count to the current value of TOTAL-BW-CNT and HP-10--CNT. If this sum is less than or equal to the HIGH-LIMIT, then the receive FIFO proceeds to block 1018. Here, the receive FIFO loads the available high-priority 10 Mb/s SOF cells onto the bus FIFO.

At block 1026, the receive FIFO determines which ports have low-priority 10 Mb/s SOF cells ready to place onto the bus FIFO. At block 1028 the receive FIFO calculates a count representing the bandwidth of the available low-priority 10 Mb/s SOF cells (hereinafter LP-10-CNT). The receive FIFO adds this count to the current value of LOWPRI-BW-CNT to provide a low priority total. The receive FIFO also adds LP-10-CNT to the current value of TOTAL-BW-CNT, HP-10-CNT, and HP-100-CNT to provide a bandwidth total. If the low priority total is less than or equal to the LOW-LIMIT and the bandwidth total is less than or equal to the HIGH-LIMIT then the receive FIFO proceeds to block 1030. Here, the receive FIFO loads t he available low -priority 10 Mb/s SOF cells onto the bus FIFO.

At block 1032, the receive FIFO determines which ports have low-priority 100 MB/s SOF cells ready to place onto the bus FIFO. At block 1034 the receive FIFO calculates a count representing the bandwidth of the available low-priority 100 MB/s SOF cells (hereinafter LP-100-CNT). The receive FIFO adds this count to the current value of LOWPRI-BW-CNT and LP-10-CNT to provide a low priority total. The receive FIFO also adds LP-100-CNT to the current value of TOTAL-BW-CNT, HP-10-CNT, HP-100-CNT and LP-10-CNT to provide a bandwidth total. If the low priority total is less than or equal to the LOW-LIMIT and the bandwidth total is less than or equal to the HIGH-LIMIT then the receive FIFO proceeds to block 1036. Here, the receive FIFO loads the available low-priority 100 Mb/s SOF cells onto the bus FIFO.

At any of blocks 1016, 1022, 1028 or 1032, if the receive FIFO determines that the bandwidth required by the available cells would exceed that which is available, the receive FIFO proceeds to block 1040. Here the receive FIFO determines whether any of the available cells may be transmitted without exceeding the appropriate bandwidth limits. If so, these cells are placed on the bus FIFO and the receive FIFO returns to block 1010.

In another preferred embodiment, the available cells are loaded onto the bus FIFO and the bandwidth thresholds are checked after the bus interface wins an arbitration. If the bandwidth check fails for any cell while the data exchanger masters the switch bus, the cell is dropped. After the bus interface completes transmission and no longer masters the bus, the receive FIFO pointers are reset so that any dropped cells will be reloaded for the next transmission.

Figure 11:
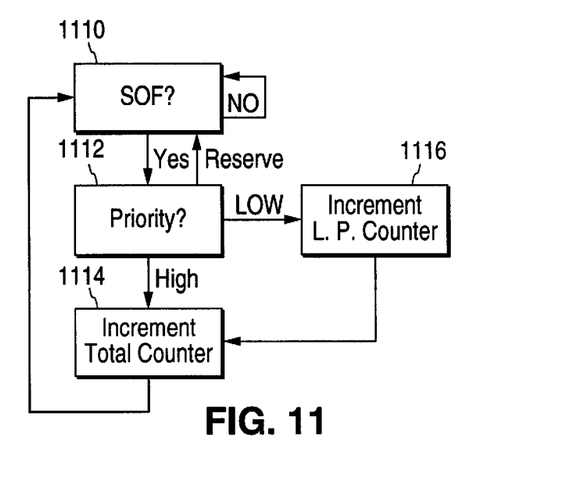
FIG. 11 is a flow chart showing one preferred operation of the bus interface of FIG. 9 as it increments bandwidth counters.

Turning to FIG. 11, a preferred operation of a bus interface (such as bus interface 138 of FIG. 9) incrementing bandwidth counters will be described. The bus interface begins at block 1110 where it monitors the switch bus for a cell containing an SOF field. Upon detection of such a cell, the bus interface proceeds to block 1112. Here, the bus interface determines the priority of the cell. If the bus interface detects a reserve cell, it returns to block 110. If it detects a low priority cell, it proceeds to block 1116. If it detects a high priority cell it proceeds to block 1114. At block 1116, bus interface 138 determines the increment amount. As explained above, 100 Mb/s cells increment the counter a proportionally greater amount than 10 Mb/s cells. Accordingly, the bus interface determines the increment amount base upon the expected bandwidth usage. After determining the increment amount, the bus interface increments the low priority counter and proceeds to block 1114.

At block 1114, the bus interface increments the high priority counter. The increment amount is determined as described at block 1116. The bus interface then returns to block 1110 to monitor for the next cell containing an SOF field.

While monitoring for cells containing SOF fields, the bus interface simultaneously monitors for cells containing EOF fields. These are used to decrement the bandwidth counters.

As was just describe, upon receipt of a SOF cell, the bandwidth counters are immediately incremented. This maintains an accurate measure of bandwidth because the SOF cells have already begun using bandwidth. Upon detection of an EOF cell, however, the counters may not be immediately decremented because they EOF cells are currently using bus bandwidth. To maintain an accurate count, the data exchanger must wait for completion of the EOF cells before decrementing the bandwidth count. To this end, a data exchanger maintains a decrement FIFO. Upon detection of an EOF cell, an entry is added to the decrement FIFO. The data exchanger monitors the decrement FIFO and after a bus latency period, the data exchanger removes the entry from the FIFO and decrements the appropriate counter.

Figure 12:
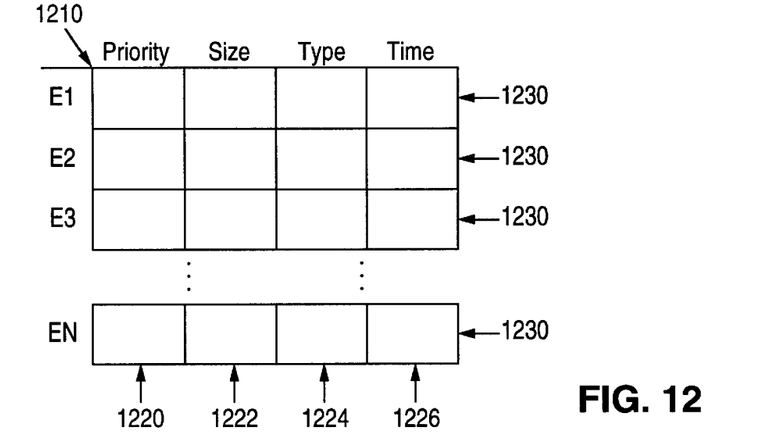
FIG. 12 is a block diagram showing one preferred embodiment of a decrement FIFO.

Turning to FIG. 12, a preferred embodiment of a decrement FIFO is shown. Decrement FIFO 1210 includes a plurality of entries 1230 (E–EN). Upon receiving a cell containing an EOF field, a new entry is added to the decrement FIFO. Each of the entries 1230 contain a priority field 1220, a size field 1222, a type field 1224, and a time field 1226. The priority field 1220 indicates the priority of the EOF cell. The size field 1222 indicates whether the frame was less than a full size frame (e.g. a quarter, half, or three-quarter size frame). The traffic type field 118 is used to indicate the type of frame. As described above, the counters are incremented by different amounts for a 10 Mb/s, 100 Mb/s, ATM OC3, ATM OC12, or other type cells. The time field stores the time since the last EOF cell. As the frames are unloaded from the FIFO, this field is used to determine when the appropriate bandwidth counter can be decremented. Upon detection of an EOF cell, a data exchanger places a new entry on the decrement FIFO.

Figure 13:
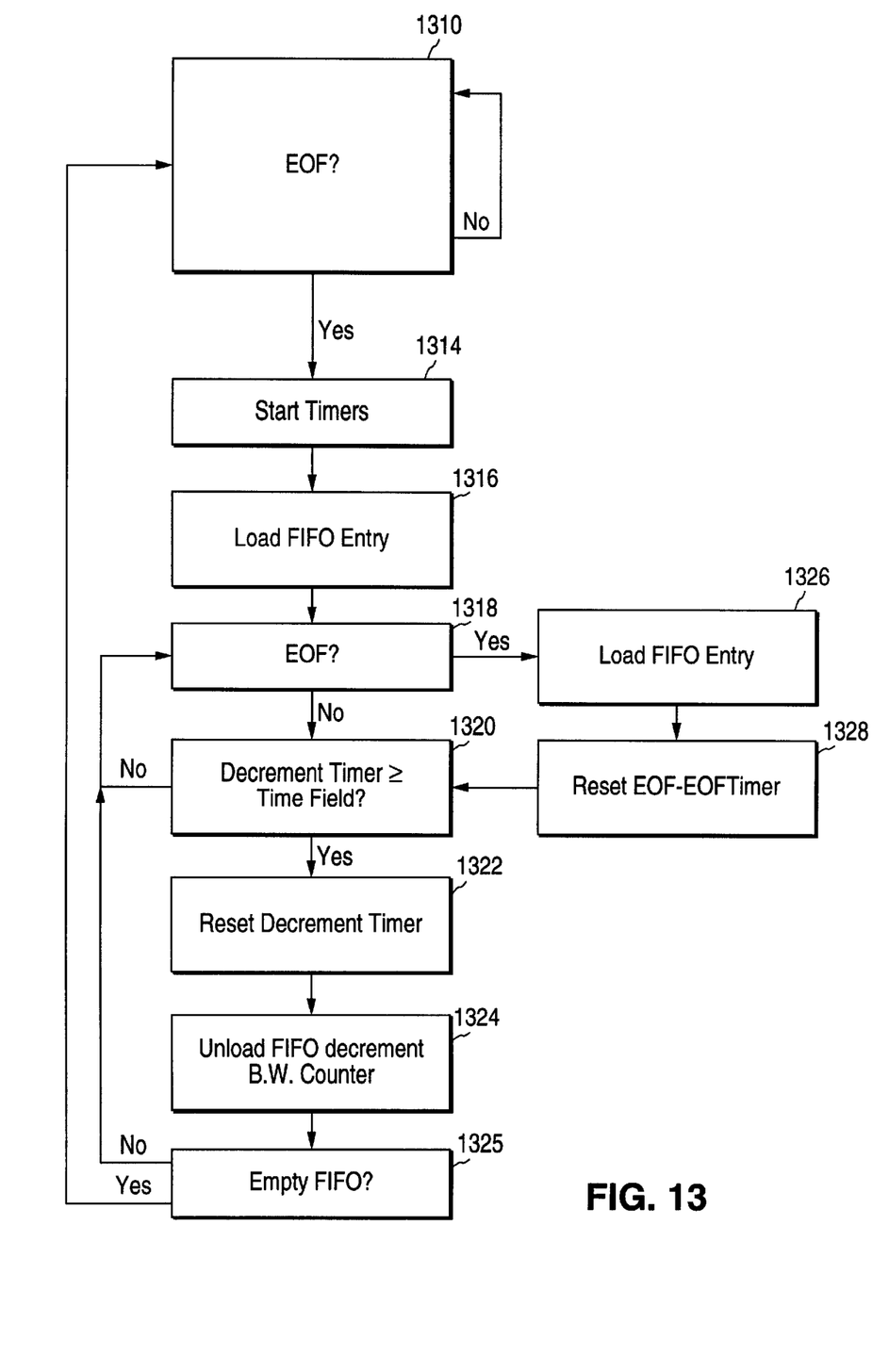
FIG. 13 is a flow chart showing one preferred operation of the bus interface of FIG. 9 as it decrements bandwidth counters.

Turning to FIG. 13, the preferred operation of a data exchanger decrementing the bandwidth counters will be described. At block 1310, the switch bus has been idle and the data exchanger monitors for an EOF cell. Upon detection of an EOF cell, the data exchanger proceeds to block 1314 and starts a decrement timer and an EOF-to-EOF timer. The decrement timer is first started when the first entry is placed on the decrement FIFO, and is subsequently reset whenever a bandwidth counter is decremented. The EOF-to-EOF timer is reset whenever a new entry is placed on the decrement stack. The EOF-to-EOF timer keeps the amount of time since the last EOF cell.

At block 1316, the data exchanger loads a new entry onto the decrement FIFO. As discussed above, the entry contains information relating to the EOF cell received at block 1310. The time field is loaded with the maximum bus latency. At block 1318, the data exchanger continues to monitor for additional EOF cells. If one is detected, the data exchanger proceeds to block 1326, otherwise the data exchanger proceeds to block 1320. At block 1326, the data exchanger loads another entry onto the decrement FIFO. The entry contains information relating to the EOF cell, which was just received, and the time field is loaded with the current value of the EOF-to-EOF timer. At block 1328, the EOF-to-EOF timer is reset and the data exchanger proceeds to block 1320.

At block 1320, the data exchanger compares the time field of the oldest entry on the decrement FIFO to the current value of the decrement timer. If the time field is less than the decrement timer, the data exchanger returns to block 1318. Otherwise, at block 1322, the data exchanger resets the decrement timer. At block 1324, the data exchanger removes the oldest entry from the e of FIFO. Based on this entry, the data exchanger decrements either the high or low-priority counter. At block 1325, the data exchanger determines whether the decrement FIFO is empty. If so, the data exchanger returns to block 1310, otherwise the data exchanger returns to block 1318. In either case, operation proceeds as described above.

The above-described operation of the data exchanger ensures that the bandwidth counter is not decremented until the EOF cell has completed transmission. Moreover, this operation requires only two timers for each data exchanger.

As described above, the receive FIFO uses the bandwidth counter to determine whether the switch bus has sufficient bandwidth available to start additional conversations. Based on bandwidth availability and on frame priority cells are loaded onto the bus FIFO for transmission over the switch bus.

In addition to arranging the incoming cells based on priority, the receive FIFO also arranging the cells based on source port. The first loading occurs in order from port 1 to port 13. After a successful transmission, the next loading occurs in order starting from one port after the first port that completed a successful transmission.

Figure 14A:
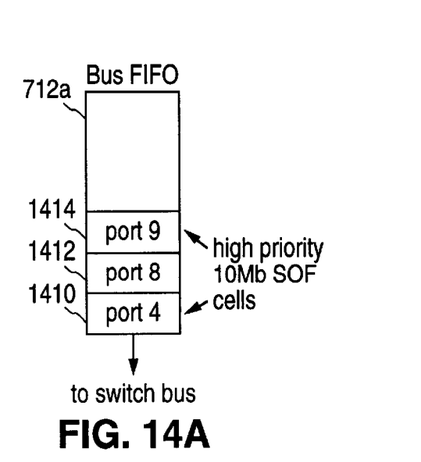
FIG. 14a is a block diagram of one preferred embodiment of a bus FIFO shown holding a first plurality of cells.
Figure 14B:
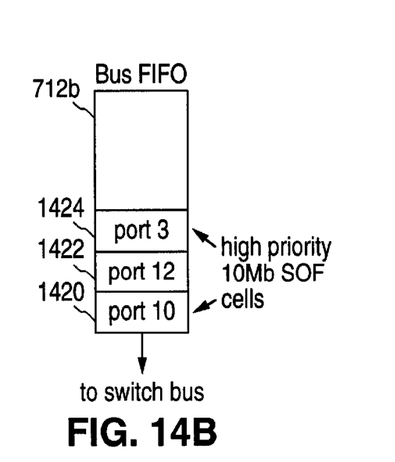
FIG. 14b is a block diagram of the bus FIFO of FIG. 14a shown holding a second plurality of cells.

This loading is illustrated by an example shown in FIGS. 14*a* and 14*b*. At initialization, port loading priority is given as follows:

| Port | Priority |
|------|----------|
| 1    | 1        |
| 2    | 2        |
| 3    | 3        |
| .    | .        |
| .    | .        |
| .    | .        |
| 11   | 11       |
| 12   | 12       |
| 13   | 13       |

Accordingly, if ports 4, 8 and 9 each indicated that they have a cell ready for transmission, the cells will be loaded onto bus FIFO 712*a* as shown in FIG. 14*a*. The port 4 cell 1410 is loaded first. The port 8 cell 1412 is loaded next. And the port 9 cell 1414 is loaded last. The cells will be transmitted over the switch bus in the order they were loaded onto bus FIFO 712*a*. After a successful transmission, loading priority is given to port 4. This port loading priority is given as follows:

| Port | Priority |
|------|----------|
| 5    | 1        |
| 6    | 2        |
| .    | .        |
| .    | .        |
| .    | .        |
| 12   | 8        |
| 13   | 9        |
| 1    | 10       |
| 2    | 11       |
| 3    | 12       |
| 4    | 13       |

Accordingly, if ports 3, 10 and 12 each indicate that they have a cell ready for transmission, the cells will be loaded onto bus FIFO 712b as shown in FIG. 14b. The port 10 cell 1420 is loaded first. The port 12 cell 1422 is loaded next and the port 3 cell 1424 is loaded last. After a successful transmission, loading priority is given to port 6. The loading priority is implemented similarly for subsequent transmissions.

During periods when the switch bus is heavily loaded, a data exchanger may not be able to transmit all available cells. If the loading priority were fixed, then during these times only the ports with the highest priority would be able to transmit any cell data. By rotating priority, switch bus access is equalized between the ports. Although the example shown in FIGS. 14a and 14b was with reference to high priority 10 Mb/s SOF cells, the same equalization is also applied to the other cell types.

Although the embodiments described herein are with reference to a data exchanger having a specific structure, the present invention can be implemented in a variety of other network switches without departing from the scope of the invention. Such other network switches may implement the invention using the functional blocks described herein or may implement other configurations to perform the same functionality. Those having ordinary skill in the art will certainly understand from the embodiments disclosed herein that many modifications are possible without departing from the teachings hereof. All embodiments and all such modifications are intended to be encompassed within the following claims.

We claim:

1. A network switch suitable for interconnecting networks, the network switch comprising:
   a plurality of ports configured to receive frames from a network and divide the frames into cells, wherein each of the cells include a source port field;
   a receive FIFO operationally coupled with the plurality of ports and configured to receive the cells from the plurality of ports;
   a switch bus interface operationally coupled with the receive FIFO and configured to receive the cells from the receive FIFO and transmit the cells over a switch bus, wherein the switch bus interface comprises a bandwidth counter configured to increment after detection of a start-of-frame cell and to decrement after detection of an end-of-frame cell;
   an end-of-frame timer configured to measure a time since a last end-of-frame cell;
   a decrement timer configured to reset when the bandwidth counter is decremented; and
   a decrement FIFO configured to store the time since the last end-of-frame cell, wherein the bus interface is configured to decrement the bandwidth counter when the decrement timer exceeds the time since the last end-of-frame cell.

2. The network switch of claim 1, and wherein each of the plurality of ports comprises a media access controller.

3. The network switch of claim 1, and wherein the receive FIFO comprises a receive manager and a bus FIFO and wherein the receive manager is configured to coordinate transferring cells from the plurality ports to the bus FIFO based on cell priority.

4. The network switch of claim 1, and wherein the bandwidth counter is configured to decrement one latency period after the detection of an end-of-frame cell.

5. The network switch of claim 1, and wherein the switch bus interface is further configured to receive cells from another network switch via the switch bus and to route the cells based upon the source port field.

6. The network switch of claim 5, and wherein the switch bus interface further comprises a routing table and wherein the switch bus interface is configured to determine routing information by indexing the routing table using the source port field.

7. The network switch of claim 6, and wherein the routing table comprises a plurality of entries, wherein each of the entries includes a source port field and a destination field.

8. A network switch suitable for interconnecting network devices, the network switch comprising:
   a plurality of ports configured to send data to and receive data from a plurality of network devices;
   a receive FIFO configured to receive data from the plurality of ports;
   a transmit FIFO configured to transmit data to the plurality of ports;
   a bus interface operationally coupled with the receive FIFO and the transmit FIFO and configured to monitor a switch bus and to transmit and receive data over the switch bus, wherein the bus interface includes
      a bandwidth counter configured to increment after detection of a start-of-frame field and to decrement after detection of an end-of-frame field;
      a decrement FIFO operationally coupled with the bandwidth counter wherein the bus interface is configured to store end-of-frame data on the decrement FIFO and to decrement the bandwidth counter after the end-of-frame data has been stored on the decrement FIFO for a latency period,
   and wherein the bandwidth counter includes
      a low-priority bandwidth counter configured to increment after detection of a low-priority start-of-frame field and to decrement after detection of a low-priority end-of-frame field; and
      a total bandwidth counter configured to increment after detection of low-priority and high-priority start-of-frame field and to decrement after detection of low-priority and high-priority end-of-frame fields.

9. The network switch of claim 8, wherein the decrement FIFO is configured to hold a plurality of entries, wherein each entry includes a type field and a time field and wherein the bus interface is configured to determine a decrement amount based upon the type field and to determine the latency period based upon the time field.

10. The network switch of claim 9, and wherein the bus interface is configured to store a time since a last end-of-frame field value in the time field.

11. The network switch of claim 10, and wherein the bus interface further comprises a decrement timer configured to reset after decrementing the bandwidth counter and wherein the bus interface is configured to decrement the bandwidth counter when the decrement timer indicates a value which exceeds the time since the last end-of-frame field value.

12. The network switch of claim 11, and wherein the data received by the bus interface includes a source port identifier and wherein the bus interface is configured to select an entry from a routing table based upon the source port identification.

13. The network switch of claim 9, and wherein the bus interface further comprises a routing table having source field and destination field entries and wherein the bus interface is further configured to route data received over the switch bus based upon the routing table.

14. The network switch of claim 13, and wherein the bus interface is further configured to add selectively an entry to the routing table after receiving start-of-frame data.

15. The network switch of claim 14, and wherein the bus interface is further configured to invalidate selectively an entry of the routing table after receiving end-of-frame data.

16. A method of exchanging data over a network switch comprising the steps of:

receiving start-of-frame data over a switch bus;

incrementing a bandwidth counter after receipt of the start-of-frame data;

receiving end-of-frame data over the switch bus;

adding an entry to a decrement FIFO after receiving the end-of-frame data, wherein the entry includes a time field that contains a value indicating a time since the receipt of the last end-of-frame data;

decrementing the bandwidth counter one latency period after adding the entry to the decrement FIFO;

resetting a decrement timer contemporaneous with the step of decrementing the bandwidth counter; and removing an oldest entry from the decrement FIFO when a value of the decrement timer is greater than the value of the time field of the oldest entry.

17. The method of claim 16, and wherein the step of receiving start-of-frame data comprises receiving high-bandwidth and low-bandwidth start-of-frame data, and wherein the step of incrementing the bandwidth counter comprises incrementing the bandwidth counter by a first amount after receipt of high-bandwidth start-of-frame data and incrementing the bandwidth counter by a second amount after receipt of low-bandwidth start-of-frame data, and wherein the first amount is greater than the second amount.

* * * * *